Patented Feb. 28, 1950

2,499,120

UNITED STATES PATENT OFFICE 2,499,120

PRODUCTION OF HEXACHLOROCYCLO-HEXANE

Dean B. Stormon, Niagara Falls, N. Y., assignor to Hooker Electrochemical Company, Niagara Falls, N. Y., a corporation of New York No Drawing. Application May 20, 1947, Serial No. 749,366

6 Claims. (Cl. 204—163)

The present invention relates to the preparation of hexachlorocyclohexane (1,2,3,4,5,6-hexachlorocyclohexane), and is more particularly concerned with the conversion of benzene to hexachlorocyclohexane containing an enhanced proportion of the gamma-isomer and characterized by practical freedom from heptachlorocyclohexane and undesirable impurities.

It is known that the gamma-isomer of hexachlorocyclohexane is an effective insecticide, and that hexachlorocylohexane containing significant proportions of the gamma-isomer is a suitable constituent of insecticidal compositions. Such hexachlorocyclohexane isomeric mixtures are of a white crystalline nature, and are readily adaptable to ordinary grinding procedures. However, according to known methods for producing hexachlorocyclohexane, minor proportions of substitution derivatives are also usually produced, such as heptachlorocyclohexane and octachlorocyclohexane. These substitution products in some ways detract materially from the desirable properties of a heaxachlorocyclohexane composition characterized by freedom from the same. Compositions of hexachlorocyclohexane together with more than about one per cent of substitution products, especially heptachlorocyclohexane, are, instead of a crystalline material suitable for grinding, of an oily, consistency, which makes grinding or other practical size reduction methods tedious and difficult. It would therefore be highly desirable to be able to produce a hexachlorocyclohexane composition which is characterized by practical freedom from heptachlorocyclohexane and other substitution products, and especially such a hexachlorocyclohexane composition which is high in gamma-isomer content.

It is known in the art to produce addition products of benzene by various procedures. Representative methods for the addition chlorination of benzene have found varying acceptability in the production of hexachlorocyclohexane, but all previous processes have been attended by numerous disadvantages which make provision of an improved process of considerable significance.

It has been proposed, for example, to prepare hexachlorocyclohexane by the chlorination of benzene in a body of liquid chlorine. This procedure, however, is handicapped by the necessity of employing induced pressures or considerable refrigeration to maintain a body of chlorine in the liquid state, as well as by the concurrent production of considerable substitution products of benzene in the absence of light, under which condition the process is usually conducted. The substitution products usually include both heptachlorocyclohexane and octachlorocyclohexane, inasmuch as hexachlorocyclohexane chlorinates readily to a further extent in the presence of an excess of chlorine. Such a process is therefore at an obvious commercial and technical disadvantage as far as the production of hexachlorocyclohexane is concerned. The process is even further handicapped by the fact that the proportion of the gamma-isomer in the product is not as high as would be desirable, and the application of such a process in the preparation of hexachlorocyclohexane, and especially high gamma-isomer hexachlorocyclohexane, has been of exceedingly limited utility.

A somewhat more suitable method proposed for the production of hexachlorocyclohexane is the photochemical chlorination of benzene. Such a procedure is ordinarily satisfactory for the addition chlorination of benzene, but leaves much to be desired in the production of hexachlorocyclohexane having a high gamma-isomer content. Under ordinarily practiced procedure for photochemical chlorination, the chlorine is added to liquid benzene which is exposed to actinic light. The product of a benzene chlorination in such manner, however, is subject to the disadvantage of grindability outlined above, as certain proportions of substitution products are ordinarily produced thereby even in the absence of a substitution catalyst. The process is further impeded by separation of solid hexachlorocyclohexane and other solid chlorination products, and such procedure thus also suffers from disadvantages due to the inability of light rays satisfactorily to penetrate the reaction mixture after solid particles once begin to form. In addition, the proportion of gamma-isomer in the product is much less than might be desired.

To obviate some of the disadvantages attendant upon the employment of photochemical chlorination, it has been proposed to pass benzene in a thin spray or film counter-current to chlorine in an attempt to eliminate the difficulty of accumulated solid material. This modification has also proven inadequate, as it is productive of a relatively high proportion of hexachlorocyclohexane substitution products, and consequently a relatively low per cent of the gamma-isomer, inasmuch as chlorine is always present in excess at the point of product withdrawal, and hexachlorocyclohexane, including the gamma-isomer thereof, is therefore readily chlorinated to heptachlorocyclohexane in the presence of light. The procedure of the above process has thus also failed to provide an economical and practicable method for the production of high gamma-content hexachlorocyclohexane, characterized by practical freedom from substitution products.

While various other methods have also been proposed for the production of hexachlorocyclohexane, the same or similar disadvantages as those mentioned above accrue to their employment, and investigators have been relegated to investigating complicated separation and grinding procedures in an effort to counteract the undesirable effects of the seemingly inevitable substitution products. Likewise, it has appeared that the important but relatively low proportion of the gamma-isomer in the product was an immutable phenomenon.

The present invention is therefore concerned with a new and useful improvement whereby unprecedented yields of hexachlorocyclohexane, containing a greatly enhanced proportion of gamma-isomer, may be obtained, and whereby the proportion of substitution products is reduced to a negligible minimum. In view of the insecticidal significance of the composition thus produced, the new process should have a wide acceptance commercially.

The present invention essentially comprises the step of exposing benzene in the liquid phase and chlorine, in a ratio of above about 3.0 moles of benzene to one mole of chlorine, to actinic radiation, while the said reactants are flowing cocurrently, i. e., in the same direction, in an elongated reaction zone. This cocurrent flow may be in any direction, but is preferably from the top to the bottom of the particular elongated reaction zone employed. By the employment of cocurrent flow, we are able to accomplish a rapid rate of reaction between chlorine and liquid benzene while in the zone of actinic radiation. The hexachlorocyclohexane produced is thus substantially entirely maintained in an infinite dispersion in the liquid while in the reaction zone, and does thus not hamper or impede reaction in any way. This offers a distinct advantage over any prior-employed methods of benzene chlorination to produce hexachlorocyclohexane.

The ratio of reactants may be any ratio above about 3.0 moles of benzene to one mole of chlorine, but is of course chosen with consideration for commercial practicability. Mole ratios greater than about 10 moles of benzene to one mole of chlorine are usually the maximum for economical operation, ratios between about 3.0 and 5 moles of benzene to one mole of chlorine, usually being employed, and preferably between about 4.5 and 5 moles of benzene to one of chlorine. Although the yield of hexachlorocyclohexane is not appreciably reduced by employment of the higher ratios, due to the possibility of recycling unreacted benzene, conversions are of course reduced and the gamma-isomer content somewhat lowered. For production of hexachlorocyclohexane containing the highest proportion of gamma-isomer and least impurities, the reaction is conducted with a mole ratio of between about 3.0 and 5 moles of benzene for each mole of chlorine.

While it is satisfactory to introduce benzene and chlorine directly and simultaneously into the irradiated reaction zone, it is preferred to admix the benzene and chlorine in the absence of actinic light and thereafter to cause them to flow in admixture into the elongated irradiated reaction zone. The apparatus in which the reactants are irradiated while flowing cocurrently therein may be constructed from any material which allows the passage therethrough of actinic radiation, ordinarily actinic light, and which is resistant to the reactants and reaction products at the temperatures employed. Any conventional elongated glass or plastic tube of sufficient light-permeability and strength is suitable, and the selection of a desirable elongated reaction zone will be apparent to one skilled in the chlorination art.

If desired, a temperature-control jacket may surround the reactor, and water or other temperature-control fluid may be circulated therethrough to maintain the reaction temperature at a desired level. Any desirable pressure may be maintained in the reaction zone by varying flow rates of the reactants or by providing a valve at the outlet end of the reaction zone. Reaction products are exhausted from the end of the reaction zone opposite the point of introduction, and thereafter may be conducted into a vacuum evaporation apparatus wherein unreacted benzene is volatilized, and the resulting solidified product dried. Conversion of benzene to hexachlorocyclohexane, when operating in this manner, depends upon the reactant ratios employed, varying from about one to about 10 per cent, with about 12 to 15 per cent of the converted benzene emerging as the gamma-isomer and less than one per cent of the converted benzene as heptachlorocyclohexane and other substitution products. The gamma content of the product was determined according to the procedure of Daasch and Smith (Navy Research Report P-3033, "Analysis of Insecticide '666' by Infrared Spectroscopy," February 6, 1947). The benzene volatilized from the reaction product may be condensed and returned to the reaction zone, preferably after purification, or the reaction products may be treated for separation and purification purposes in any other suitable manner.

The temperature of the chlorination may be maintained anywhere within the liquid range of benzene, viz., from about five to 78 degrees centigrade, without loss in operativeness or advantage. Temperatures between about five and sixty degrees centigrade appear to be most desirable, as within this lower range the most exceptional results have been obtained.

The method of the present invention will be more apparent from the following examples, which are illustrative only and are in no way to be construed as limiting.

*Example I*

A continuous glass tube spiral chlorinator comprising a coil of about five inches internal diameter was constructed from 88 feet of fifteen-millimeter glass tubing. The spiral chlorinator was about five feet in length and contained about seventy coils. Located internally of the coil and in a parallel position thereto was a 3600-watt mercury vapor lamp. The spiral coil was encased in a cooling jacket through which temperature control water was circulated.

Cooling water, maintained at a temperature of ten degrees centigrade, was circulated through the temperature control jacket. Chlorine and benzene were introduced simultaneously into the spiral reactor, about one foot from the beginning of the coil in the dark, at the rate of 0.414 mole per hour and 1.95 moles per hour, respectively, and under a hydrostatic pressure of seven pounds per square inch. The mole ratio was about 4.72 moles of benzene to one mole of chlorine. The space velocity of the reactants was about 0.416. The mixture of reactants passed into the irradiated zone, where a temperature of between about 57 and 60 degrees centigrade was attained.

The reaction products were exhausted from the end of the coil reactor at about atmospheric pressure and were conducted into a vacuum evaporation apparatus where unreacted benzene was volatilized. The volatilized benzene was then condensed, dried, and returned to the reaction zone. Hexachlorocyclohexane was produced at the rate of 0.138 mole per hour, corresponding to a 7.1 per cent conversion. Fourteen and seven-tenths per cent of the converted benzene was separated as the gamma-isomer, with less than one per cent of the converted benzene being transformed into heptachlorocyclohexane.

Example II

After the manner of Example I, a mixture of benzene and chlorine in a mole ratio of 3.2 to one (1.62 moles of benzene and 0.51 mole of chlorine per hour) was continuously introduced into the reactor, under a hydrostatic pressure of nine pounds per square inch, the space velocity being 0.359.

Hexachlorocyclohexane was produced at the rate of 0.148 mole per hour, corresponding to a 9.2 per cent conversion. Fifteen and two-tenths per cent of the converted benzene was separated as the gamma-isomer, with less than one per cent of the converted benzene being transformed into heptachlorocyclohexane.

Example III

Example I was repeated except that the reactant ratio was maintained at 4.1 moles of benzene to one mole of chlorine. One and eighty-four one-hundredths moles of benzene and 0.45 mole of chlorine per hour were continuously introduced into the reactor under a hydrostatic pressure of eight pounds per square inch, the space velocity being 0.395.

Hexachlorocyclohexane was produced at the rate of 0.15 mole per hour, corresponding to an 8.2 per cent conversion. Fourteen and one-tenth per cent of the converted benzene was separated as the gamma-isomer, with less than one per cent of the converted benzene being transformed into heptachlorocyclohexane.

Example IV

Example I was repeated except that the ratio was maintained at 10.75 moles of benzene to one mole of chlorine by introducing 1.95 moles of benzene and 0.18 mole of chlorine per hour continuously into the reactor under a hydrostatic pressure of four pounds per square inch, the space velocity being 0.404. Temperature of control water was 45 degrees centigrade.

Hexachlorocyclohexane was produced at the rate of 0.061 mole per hour, corresponding to 3.1 per cent conversion. Twelve and five-tenths per cent of the converted benzene was separated as the gamma-isomer, with less than one per cent of the converted benzene being transformed into heptachlorocyclohexane.

Example V

Example I was repeated except that the mole ratio was maintained at 29.8 moles of benzene to one mole of chlorine by introducing 1.95 moles of benzene and 0.066 mole of chlorine per hour continuously into the reactor under a hydrostatic pressure of two pounds per square inch, the space velocity being 0.397. Temperature of control water was 57 degrees centigrade.

Hexachlorocyclohexane was produced at the rate of 0.022 mole per hour, corresponding to a 1.12 per cent conversion. Twelve and three-tenths per cent of the converted benzene was separated as the gamma-isomer, with less than one per cent of the converted benzene being transformed into heptachlorocyclohexane.

Example VI

Water maintained at a temperature of about 50 degrees centigrade was circulated through the jacket while chlorine and benzene were cocurrently introduced into the spiral reactor, described in Example I, about one foot from the beginning of the coil in the dark, at the rate of 0.433 mole per hour and 1.95 moles per hour, respectively, under a hydrostatic pressure of ten pounds per square inch. The mole ratio was about 4.51 moles of benzene to one mole of chlorine, and the space velocity was about 0.417.

The mixture passed into the irradiated zone where a reaction temperature of about 72 to 75 degrees centigrade was attained. The reaction products were exhausted from one end of the coil reactor at atmospheric pressure, and were conducted into a vacuum evaporation apparatus where unreacted benzene was volatilized therefrom, condensed, dried, and then returned to the reaction zone.

Hexachlorocyclohexane was produced at the rate of 0.144 moles per hour, corresponding to a 7.4 per cent conversion. Fourteen per cent of the converted benzene was separated as the gamma-isomer, with less than one per cent of the converted benzene being transformed into heptachlorocyclohexane.

Example VII

Cooling water maintained at a temperature of about ten degrees centigrade was circulated through the cooling jacket of the apparatus described in Example I. Benzene and chlorine in a ratio of 10.65 moles of benzene to one mole of chlorine, were introduced into the reactor under a hydrostatic pressure of three pounds per square inch. The space velocity was 0.403. The mixture passed into the irradiated zone, where a reaction temperature of about 30 degrees centigrade was attained.

Hexachlorocyclohexane was produced at the rate of 0.061 mole per hour, corresponding to a 3.13 per cent conversion to hexachlorocyclohexane. Fourteen per cent of the converted benzene was separated as the gamma-isomer, with less than one per cent of the converted benzene being transformed into heptachlorocyclohexane.

Example VIII

Cooling water maintained at a temperature of about ten degrees centigrade was circulated through the jacket of the apparatus described in Example I. Benzene and chlorine in a ratio of 26.7 moles to one mole, were introduced at a hydrostatic pressure of two pounds per square inch into the reactor, the space velocity being 0.396. The reaction mixture passed into the irradiated zone where a temperature between about 20 degrees centigrade and 22 degrees centigrade was attained.

Hexachlorocyclohexane was produced at the rate of 0.024 mole per hour, corresponding to 1.25 per cent conversion to hexachlorocyclohexane.

Fourteen and five-tenths per cent of the converted benzene was separated as the gamma-isomer, with less than one per cent of the converted benzene being transformed into heptachlorocyclohexane.

Example IX

Example I was repeated except that 1.076 moles of benzene and 0.197 mole of chlorine were introduced into the reactor per hour, corresponding to a mole ratio of 5.46 to one, under a hydrostatic pressure of five pounds per square inch. The space velocity was 0.228.

Hexachlorocyclohexane was produced at the rate of 0.066 mole per hour, corresponding to a 6.1 per cent conversion. Fourteen per cent of the converted benzene was separated as the gamma-isomer, with less than one per cent of the converted benzene being transformed into heptachlorocyclohexane.

Example X

Example I was repeated except that 0.643 moles of benzene and 0.143 mole of chlorine were introduced into the reactor per hour, corresponding to a mole ratio of 4.51 to one, under a hydrostatic pressure of five pounds per square inch. The space velocity was 0.137.

Hexachlorocyclohexane was produced at the rate of 0.048 mole per hour, corresponding to a 7.4 per cent conversion. Fourteen and one-tenth per cent of the converted benzene was separated as the gamma-isomer, with less than one per cent of the converted benzene being transformed into heptachlorocyclohexane.

Example XI

A continuous glass tube spiral chlorinator was constructed from 40 feet of 10-millimeter glass tubing. The spiral chlorinator was about four feet in height and contained about forty coils. Located internally of the coil and in a parallel position thereto was a 1200-watt mercury vapor lamp. The spiral coil was encased in a water jacket through which temperature control water was circulated. The discharge end of the coil was fitted with a valve for control of pressure within the reactor. The spiral coil was located vertically, with the benzene and chlorine inlet at the top and the product outlet at the bottom.

Cooling water maintained at a temperature of ten degrees centigrade was circulated through the jacket, while 1.12 moles of benzene and 0.197 mole of chlorine per hour were cocurrently introduced into the reactor, under a hydrostatic pressure of 21 pounds per square inch, about one foot from the top coil in the dark, corresponding to a mole ratio of 5.66 to one.

The reaction mixture passed into the irradiated zone, where a temperature of from about 57 to 60 degrees centigrade was attained. The space velocity was about 0.32. A pressure of 14 pounds per square inch was maintained within the reaction zone by partially closing the discharge valve at the end of the coil.

Hexachlorocyclohexane was produced at the rate of 0.066 mole per hour, corresponding to 5.9 per cent conversion. Fourteen per cent of the converted benzene was separated as the gamma-isomer. Less than one per cent of the converted benzene was transformed into heptachlorocyclohexane.

After separation of hexachlorocyclohexane and other crystalline products, excess benzene was volatilized, condensed, and returned to the coil for further conversion to hexachlorocyclohexane.

In the preceding examples, the space velocity of reactants is to be understood as the number of milliliters of effluent liquid per milliliter of reaction space per minute. This space velocity is ordinarily maintained between about 0.1 and 0.5 during the continuous production of hexachlorocyclohexane by the method herein disclosed, but such a range of space velocity is to be understood as constituting one of the preferred operating conditions, and not as being a mandatory condition for operativeness of the process. Various different space velocities will be found satisfactory and desirable with various lengths of reaction zone, various cross sections of reaction zone, various flow rates of reactants, and other related conditions, but the range delineated above has presently been found most suitable for attainment of the desired results.

Various modifications may be made in the method of the invention without departing from the spirit or scope thereof, and it is to be understood that I limit myself only as defined in the appended claims.

I claim:

1. A process for the production of hexachlorocyclohexane having a high content of the gamma isomer of hexachlorocyclohexane and substantially free of chlorinated substitution products, which comprises mixing liquid benzene and gaseous chlorine in a ratio between approximately 3.0 moles and approximately 5.0 moles of benzene to one mole of chlorine so that no substantial interaction between the benzene and the chlorine occurs during mixing, flowing the said mixture of chlorine and benzene at a space velocity between approximately 0.1 and approximately 0.5 milliliter of effluent liquid per milliliter of reaction space per minute through a reaction zone activated by a source of actinic radiation while the said zone is maintained at a temperature between approximately five degrees and approximately 78 degrees centigrade and the benzene is substantially in the liquid phase, the said reaction zone being of such dimensions that at the selected rate of flow substantially all of the chlorine is completely reacted before leaving the reaction zone, and subsequently recovering hexachlorocyclohexane from the product.

2. A process for the production of hexachlorocyclohexane having a high content of the gamma isomer and substantially free of chlorinated substitution products which comprises mixing liquid benzene and gaseous chlorine in a ratio between approximately 4.5 moles and approximately 5.0 moles of benzene to one mole of chlorine so that no substantial interaction between the benzene and the chlorine occurs during mixing, flowing the said mixture of chlorine and benzene at a space velocity between approximately 0.1 and approximately 0.5 milliliter of effluent liquid per milliliter of reaction space per minute through a reaction zone activated by a source of actinic radiation while the said zone is maintained at a temperature between approximately 5 degrees centrigrade and approximately 60 degrees centigrade and the benzene is substantially in the liquid phase, the said reaction zone being of such dimensions that at the selected rate of flow substantially all of the chlorine is completely reacted before leaving the reaction zone, subsequently recovering hexachlorocyclohexane from the product by evaporation and recycling the unreacted benzene to the reaction zone.

3. A process for the production of hexachlorocyclohexane having a high content of the gamma isomer of hexachlorocyclohexane and substantially free of chlorinated substitution products which comprises mixing liquid benzene and gaseous chlorine in a ratio of approximately 4.72 moles of benzene to one mole of chlorine in the dark so that no substantial interaction between the benzene and the chlorine occurs during mixing, flowing the said mixture of chlorine and benzene at a space velocity of approximately 0.416 milliliter of effluent liquid per milliliter of reaction space per minute through a reaction zone activated by a source of actinic radiation while the said reaction zone is maintained at a temperature between approximately 57 degrees and approximately 60 degrees centigrade and the benzene is substantially in the liquid phase, the said reaction zone being of such dimensions that at the selected rate of flow substantially all of the chlorine is completely reacted before leaving the reaction zone, subsequently recovering hexachlorocyclohexane from the product by vacuum evaporation and recycling the unreacted benzene to the reaction zone.

4. A process as defined in claim 1, wherein the space velocity of the reactants is approximately 0.417 milliliter of effluent liquid per milliliter of reaction space per minute, the ratio of reactants is approximately 4.51 moles of benzene to one mole of chlorine, and the reaction zone is maintained between a temperature of approximately 72 degrees and approximately 75 degrees centigrade.

5. A process as defined in claim 1, wherein the space velocity of the reactants is approximately 0.228 milliliter of effluent liquid per milliliter of reaction space per minute and the ratio of reactants is approximately 5.46 moles of benzene to one mole of chlorine and the reaction zone is maintained under a hydrostatic superatmospheric pressure of five pounds per square inch and at a temperature between approximately five degrees and approximately 60 degrees centigrade.

6. A process for the production of hexachlorocyclohexane having a high content of the gamma isomer of hexachlorocyclohexane and substantially free of chlorinated substitution products, which comprises mixing liquid benzene and gaseous chlorine in a ratio between approximately 3.0 moles and approximately 10.0 moles of benzene to one mole of chlorine so that no substantial interaction between the benzene and the chlorine occurs during mixing, flowing the said mixture of chlorine and benzene at a space velocity between approximately 0.1 and approximately 0.5 milliliter of effluent liquid per milliliter of reaction space per minute through a reaction zone activated by a source of actinic radiation while the said zone is maintained at a temperature between approximately five degrees and approximately 78 degrees centigrade and the benzene is substantially in the liquid phase, the said reaction zone being of such dimensions that at the selected rate of flow substantially all of the chlorine is completely reacted before leaving the reaction zone, and subsequently recovering hexachlorocyclohexane from the product.

DEAN B. STORMON.

REFERENCES CITED

The following references are of record in the file of this patent:

UNITED STATES PATENTS

| Number | Name | Date |
| --- | --- | --- |
| 1,379,367 | Sparre et al. | May 24, 1921 |
| 1,523,563 | Snelling | Jan 20, 1925 |
| 1,954,438 | Britton | Apr. 10, 1934 |

FOREIGN PATENTS

| Number | Country | Date |
| --- | --- | --- |
| 504,569 | Great Britain | Apr. 26, 1939 |